United States Patent [19]

Horvath

[11] 4,425,450

[45] Jan. 10, 1984

[54] PAINT COMPOSITION COMPRISING HYDROXY FUNCTIONAL FILM FORMER AND IMPROVED STABLE FLOW CONTROL ADDITIVE

[75] Inventor: Stanley K. Horvath, Rochester, Mich.

[73] Assignee: Ford Motor Company, Dearborn, Mich.

[21] Appl. No.: 292,780

[22] Filed: Aug. 14, 1981

Related U.S. Application Data

[63] Continuation-in-part of Ser. No. 199,772, Oct. 23, 1980, abandoned, Ser. No. 199,774, Oct. 23, 1980, abandoned, and Ser. No. 199,775, Oct. 23, 1980, abandoned.

[51] Int. Cl.³ .................. C09D 3/00; C09D 3/50; C09D 3/52; C09D 5/02
[52] U.S. Cl. .................. 523/334; 523/333; 524/504; 524/507; 524/512; 525/63; 525/66; 525/67; 525/92; 525/110; 525/111; 525/123; 525/124; 525/125; 525/155; 525/156; 525/162; 525/286; 525/298; 525/299
[58] Field of Search .............. 525/66, 110, 67, 111, 525/92, 155, 156, 286, 298, 299, 63, 123–125, 162; 524/504, 512, 507; 523/333, 334

[56] References Cited

U.S. PATENT DOCUMENTS

| | | | |
|---|---|---|---|
| 3,966,667 | 6/1976 | Sullivan et al. | 260/31.2 N |
| 4,002,699 | 1/1977 | Labana et al. | 525/155 |
| 4,065,518 | 12/1977 | Labana et al. | 525/286 |
| 4,147,688 | 4/1979 | Makhlouf et al. | 260/33.6 EP |
| 4,180,489 | 12/1979 | Andrew et al. | 260/70 |
| 4,241,196 | 12/1980 | Chattha | 525/162 |
| 4,242,384 | 12/1980 | Andrew et al. | 525/85 |
| 4,276,212 | 6/1981 | Khanna et al. | 525/162 |
| 4,290,932 | 9/1981 | Wright et al. | 525/198 |
| 4,297,448 | 10/1981 | Chang et al. | 525/162 |
| 4,322,508 | 3/1982 | Peng et al. | 525/110 |
| 4,330,458 | 5/1982 | Spinelli et al. | 525/162 |
| 4,337,189 | 6/1982 | Bromley et al. | 524/529 |
| 4,340,511 | 7/1982 | Backhouse et al. | 525/69 |

*Primary Examiner*—John C. Bleutge
*Assistant Examiner*—Herbert J. Lilling
*Attorney, Agent, or Firm*—Roger L. May; Keith L. Zerschling

[57] ABSTRACT

Coating compositions comprising hydroxy functional film formers, crosslinking agent therefor and a novel flow control additive. Flow control additive comprises stable crosslinked dispersion formed by addition polymerization of selected monomers in the presence of (i) organic liquid which is a solvent for the monomers, but a non-solvent for the polymer and (ii) polymeric dispersion stabilizer having solvated and non-solvated segments, wherein the dispersion is stabilized further by inclusion therein of a butylated melamine formaldehyde resin.

25 Claims, No Drawings

PAINT COMPOSITION COMPRISING HYDROXY FUNCTIONAL FILM FORMER AND IMPROVED STABLE FLOW CONTROL ADDITIVE

This application is a continuation-in-part of Ser. Nos. 199,772, 199,774 and 199,775 filed Oct. 23, 1980 and now abandoned.

BACKGROUND OF THE INVENTION

This invention relates to coating compositions comprising hydroxy functional film former and an improved stable flow control additive which substantially reduces or eliminates settling and separation of the flow control additive from the composition. More particularly, the invention relates to such coating compositions containing flow control additive of the type comprising crosslinked dispersions containing microgel particles, which are prepared by addition polymerization of (a) first and second ethylenically unsaturated monomers each bearing functionality capable of crosslinking with the other and (b) at least one other monoethylenically unsaturated monomer, in the presence of (I) organic liquid which is a solvent for the polymerizable monomers, but a non-solvent for the resultant polymer and (II) a polymeric dispersion stabilizer containing at least two segments, with one segment being solvated by said organic liquid and the other segment being of a different polarity than said first segment and relatively insoluble in said organic liquid. Still more particularly, the invention relates to such compositions wherein the flow control additive comprises such stable crosslinked dispersions which are further stabilized by an additional stabilizer which, except for solvents, consists essentially of butylated melamine formaldehyde resin. Preferred compositions including the stabilized crosslinked dispersions are intermediate and high solids thermosetting compositions which are adapted to provide an automotive topcoat demonstrating hardness, high glass, outstanding durability and excellent resistance to solvents and water.

Because of increasingly strict solvent emission regulations in recent years, low solvent emission paints have become desirable. A number of intermediate and high solids paint compositions have been proposed to meet these low solvent emission requirements. However, many of these compositions are deficient because of difficulty in application, poor flow out, lack of smoothness and evenness and poor distribution of pigment, particularly metallic flake pigments. The deficiency in compositions including metallic flake results from undesired reorientation of the metallic flake during application and curing of the coating. Flake reorientation results primarily because of the very low viscosity resins used in paint compositions to accommodate intermediate and high solids. The viscosity of these resins is not sufficient to immobilize the flakes which tend to redistribute themselves to show "reverse flop" and non-uniform distribution.

The preferred coating compositions of this invention, as a result of the improved flow control additive component thereof, combine desirable properties, including lower solvent content and low application viscosity, while also overcoming deficiencies of some of the previously proposed imtermediate and high solids materials, thereby achieving intermediate and high solids coating compositions particularly adapted for automotive topcoats including metallic flake as pigment.

COPENDING APPLICATIONS

Several copending patent applications, all assigned to Ford Motor Company and all in the name of Stanley K. Horvath, cover related compositions.

Application Ser. No. 200,222 filed Oct. 23, 1980 and entitled "Improved Stable Crosslinked Dispersion" claims the improved stable crosslinked dispersion employed as a flow control additive in compositions of this invention.

Application Ser. No. 292,853, filed concurrently herewith and entitled "Stabilized Crosslinked Dispersion" (continuation-in-part of Ser. No. 199,899 filed Oct. 23, 1980) teaches stabilized dispersions similar to those employed in compositions of this invention, but made using still another stabilizer. Application Ser. No. 292,843, also filed concurrently herewith and entitled "Paint Composition Comprising Hydroxy Functional Film Former and Improved Stabilized Flow Control Additive" (continuation-in-part of Ser. Nos. 199,776, 199,794 and 199,805 filed Oct. 23, 1980) teaches use of these crosslinked dispersions as flow control additives in compositions similar to those of the invention.

Compositions of the type disclosed and claimed in this application, except for the addition of the stable crosslinked dispersion flow control additive, were developed by coworkers of the inventor of the subject invention. Those compositions were prepared both with and without flow control additives. However, the preferable compositions were those prepared using a flow control additive which was made generally in accordance with the teaching of U.S. Pat. No. 4,147,688 to Makhlouf et al. That patent teaches stable crosslinked dispersions wherein crosslinked acrylic polymer microgel particles are formed by free radical addition polymerization of alpha, beta ethylenically unsaturated monocarboxylic acid, at least one other copolymerizable monoethylenically unsaturated monomer and a certain percentage of crosslinking monomer, in the presence of a hydrocarbon dispersing liquid (see abstract, examples and claims). Other crosslinked dispersions containing microgel particles are disclosed in the patent applications and patents referred to in the Makhlouf et al disclosure.

U.S. Pat. No. 4,025,474 to Porter et al discloses a polyester based coating composition which includes the crosslinked dispersions disclosed by Makhlouf et al. U.S. Pat. No. 4,075,141 to Porter et al disclose carboxylic acid amide interpolymer-based coating compositions including the same crosslinked dispersions. U.S. Pat. No. 4,115,472, also to Porter et al, dicloses urethane coating compositions also including the crosslinked dispersions of Makhlouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with nonhydroxyl bearing monomers in the presence of the stabilizer disclosed by Makhlouf et al, and (c) melamine resin. The microgel dispersion of Sullivan et al thus contains functionality capable of reacting with the melamine crosslinking agent.

The dispersion stabilizer employed in producing the microgel particles of the Makhlouf et al compositions are generally polymeric and contain at least two segments, with one segment being solvated by the dispersing liquid and the other segment being of different polarity than the first segment and relatively insoluble, compared to the first segment, in the dispersing medium. Included among the dispersion stabilizers referred to in the Makhlouf et al patent are polyacrylates and methacrylates, such as poly (lauryl) methacrylate and poly (2-ethylhexylacrylate); diene polymers and copolymers such as polybutadiene and degraded rubbers; aminoplast resins, particularly high naphtha-tolerant compounds such as melamine formaldehyde resins etherified with higher alcohols (e.g. alcohols having 4 to 12 carbon atoms); and various copolymers designed to have desired characteristics (see Col. 5, lines 1–27).

Among the numerous dispersion stabilizers which could be employed in compositions of Makhlouf et al and which are suitable for preparations of flow control additives used in compositions of this invention are those taught by U.S. Pat. No. 3,607,821 to Clarke. Clarke teaches a stabilizer for non-aqueous dispersions wherein the stabilizer is chemically reacted with dispersed particles of the dispersion (Col. 1, lines 36–42). Each co-reactant stabilizer molecule forms from 1 to 10 (preferably 1 to 4) covalent links with the dispersed polymer (Col. 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

Particularly preferred dispersion stabilizers of Makhlouf et al and the stabilizers employed in preferred compositions of this invention are those which are graft copolymers comprising two polymeric segments, with one segment being solvated by the dispersing liquid and usually not associated with polymerized particles of the polymerizable ethylenically unsaturated monomers and the other segment being an anchor polymer of different polarity from the first type which is relatively non-solvatable by the hydrocarbon solvent and capable of anchoring with the polymerized particles of the ethylenically unsaturated monomer. This anchor polymer segment contains pendent groups capable of copolymerizing with the ethylenically unsaturated monomers of the dispersion (See Col. 5, lines 28–40 of Makhlouf et al).

One of the serious disadvantages of the aforementioned prior art types of crosslinked dispersions containing microgel particles is their lack of stability, both alone and when employed in other compositions. It has been found that the shelf stability of such crosslinked dispersions is not sufficient to allow shipment and storage of these materials for reasonable periods of time before they are employed without the compositions suffering from separation and settling. Furthermore, it has been found that when such compositions are employed in coating compositions as additives, such as a flow control additive, they tend to settle out and separate from the composition, thus creating a viscosity and "kickout" problem. The crosslinked dispersions employed in compositions of this invention are particularly desirable as flow control additives in those compositions in which metallic flake is employed as a pigment in as much as they afford improved metallic pigment control. Of course, when such additives settle and separate from the composition, the advantages insofar as the pigment control features are concerned, are seriously diminished.

It has been found that by further stabilizing the crosslinked dispersions employed as flow control additives in compositions of this invention by addition of butylated melamines the aforementioned problems can be effectively eliminated, thus providing coating compositions which do not suffer from separation or settling problems and which are particularly well suited as thermosetting enamels used for automotive applications.

BRIEF DESCRIPTION OF THE INVENTION

This invention relates to coating compositions of the type comprising hydroxy functional film formers and a crosslinking agent bearing functionality capable of reacting with the hydroxyl groups of the film former. The improvement of the invention comprises including in the composition a flow control additive containing a stable crosslinked dispersion containing microgel particles. The additive is included in an amount ranging from about 0.5 to about 30, preferably about 3 to about 15, parts of resin solids in the flow control additive per 100 parts of total resin solids in the composition.

The flow control additive or stable, crosslinked dispersion is formed by addition polymerization of (a) first and second ethylenically unsaturated monomers each bearing functionality capable of crosslinking reaction with the other and (b) at least one other monoethylenically unsaturated monomer, in the presence of (I) a hydrocarbon dispersing liquid which is a solvent for the polymerizable monomers, but a non-solvent for the resultant polymer, and (II) a polymeric dispersion stabilizer containing at least two segments, with one segment being solvated by said dispersing liquid and the other segment being of different polarity than said first segment and relatively insoluble in the dispersing liquid. The reaction is carried out at elevated temperature such that the dispersion polymer first forms and then is crosslinked. The flow control additive employed in compositions of the invention is stabilized further by inclusion therein of a further stabilizer which, except for solvent, consists essentially of butylated melamine formaldehyde resin having a number average molecular weight in the range of about 700 to about 2,500. This further stabilizer is included in the crosslinked dispersion in an amount ranging from about 25 to about 75 parts of resin solids per 100 parts of total resin solids in the crosslinked dispersion.

The preferred improved intermediate solids coating compositions of the invention comprise: (I) a film forming component comprising hydroxy functional copolymer; (II) butylated melamine formaldehyde crosslinking agent; and (III) the above flow control additive.

The film forming component comprises hydroxy functional copolymer having a number average molecular weight ($M_n$) of greater than about 5,000 and a glass transition temperature of between about $-25°$ C. and about $70°$ C., the hydroxy functional copolymer being formed from about 5 to about 50 weight percent of hydroxy functional monoethylenically unsaturated monomers and a remainder of other monoethylenically unsaturated monomers.

The butylated melamine formaldehyde crosslinking agent has a number average molecular weight of between about 700 and about 2,500 and is included in the composition in an amount ranging from about 20 to about 100 parts per 100 parts of the film forming component.

The flow control additive employed in compositions of the invention is included in the composition in an amount ranging from about 0.5 to about 30, preferably from about 3 to about 15, parts of resin solids per 100 parts of total resin solids in the composition.

The preferred improved high solids coating compositions of the invention comprise: (I) a film forming component consisting essentially of a polymeric component having a molecular weight of less than about 5,000; (II) a crosslinking agent comprising monomeric methylated melamine resin; and (III) the above flow control additive.

The film forming component consists essentially of a polymeric component having a number average molecular weight of less than about 5,000, said polymeric component comprising at least about 50 percent by weight of hydroxy functional copolymer having a number average molecular weight of between about 1,500 and about 5,000 and a glass transition temperature of between about $-25°$ C. and about 70° C. This hydroxy functional copolymer is formed from about 15 to about 35 weight percent of hydroxy functional monoethylenically unsaturated monomers, between about 2 and about 5 weight percent of alpha, beta olefinically unsaturated carboxylic acids and a remainder of other monoethylenically unsaturated monomers.

The crosslinking agent of the compositions of the invention comprises monomeric methylated melamine resin having a number average molecular weight of between about 350 and about 1,000 and is included in the composition in an amount ranging from about 20 to about 100 parts per 100 parts of the film forming component.

The flow control additive employed in compositions of the invention is included in the composition in an amount ranging from about 0.5 to about 30, preferably from about 3 to about 15, parts of resin solids per 100 parts of total resin solids in the composition.

DETAILED DESCRIPTION OF THE INVENTION

The coating compositions of the invention comprise hydroxy functional film former, crosslinking agent bearing functionality capable of reacting with the hydroxy functional group of the film former and an improved stable flow control additive comprising a stable, crosslinked dispersion containing microgel particles. In addition the compositions of the invention may include conventional additives such as catalysts, anti-oxidants, UV absorbers, wetting agents, anti-static agents, pigments, plasticizers, solvents, etc.

Flow Control Additive

Compositions incorporating the improved stable flow control additive are particularly useful as automotive topcoat enamels incorporating metallic pigment. This flow control additive which, as noted above, is a stable, crosslinked dispersion containing microgel particles, is incorporated in the compositions in an amount ranging from about 0.5 to about 30, preferably from about 3 to about 15, parts of resin solids in the flow control additive per 100 parts of total resin solids.

The improvement in the flow control additive of compositions of the invention is effected by adding to the crosslinked dispersions a further stabilizer which, except for any solvent present in the stabilizer composition, consists essentially of butylated melamine formaldehyde resin having a number average molecular weight in the range of from about 700 to about 2,500. This stabilizer is included in the crosslinked dispersion in an amount ranging from about 25 to about 75 parts, preferably from about 40 to about 60 parts, of resin solids per 100 parts of total resin solids in the crosslinked dispersion. Preferably this further stabilized dispersion used as a flow control additive in compositions of the invention has a solids level after addition of the further stabilizer and any additional solvent that may be desired in the range of 30 to 70 percent, most preferably in the range of 40 to 60 percent. Generally the further additive will be added to the crosslinked dispersion as a solution comprising one or more solvents for the butylated melamine formaldehyde resin. Preferably the further stabilizer should consist essentially of a solution of butylated melamine formaldehyde resin in an organic solvent in an amount such that the percentage solids of the butylated melamine formaldehyde resin in the solvent ranges from about 50 to about 90 percent. In a particularly preferred embodiment the further stabilizer consists essentially of a 65 percent solids solution of the butylated melamine formaldehyde resin in a 2 to 1 solution of butyl acetate and butyl alcohol.

Suitable butylated melamine formaldehyde resins fur use as in the further stabilizing additive of the invention are those prepared by condensation of melamine, formaldehyde and butyl alcohol either in a one step process under acidic conditions or in a two step process in which the melamine and formaldehyde are reacted under basic conditions followed by etherification under acidic conditions. The molecular weight is governed by the ratios of the three components. High ratios of formaldehyde to melamine and high ratios of alcohol to formaldehyde tend to yield lower molecular weight resin. The molar ratio of formaldehyde to melamine ranges from about 3.0 to 6, while the molar ratio of butanol to melamine may range from 6 to 12. Only a portion of the alcohols react and the remainder acts as a solvent. Molecular weight distributions are generally wide, with the $M_w$ range being from about 2,000 to about 10,000 and the $M_n$ ranging as stated above.

The crosslinked dispersions of microgel particles which are further stabilized as described above are prepared by addition polymerization of (a) between about 1 and about 10 mole percent, preferably between about 2 and about 5 mole percent, each of first and second ethylenically unsaturated monomers, each bearing functionality capable of crosslinking with the other and (b) between about 80 and about 98 mole percent, preferably between about 90 and about 96 mole percent, of at least one other monoethylenically unsaturated monomer. The addition polymerization is carried out in the presence of an organic liquid which is a solvent for the polymerizable monomers, but a non-solvent for the resultant polymer and in the presence of the aforementioned polymeric dispersion stabilizer.

The crosslinking functionalities on the first and second ethylenically unsaturated monomers (A) in this type of microgel dispersion can be selected from a wide variety of functionalities wich will be apparent to those skilled in the art. Among the preferred pairs of crosslinking functionalities which may be present on the first and second ethylenically unsaturated monomers are: acid and epoxide; epoxide and amine; acid anhydride and hydroxyl; acid anhydride and amine; acid anhydride and mercaptan; isocycanate and hydroxyl; hemiformal and amide; carbonate and amine; cycloimide and amine; cycloimide and hydroxyl; imine and alkoxysilane; etc.

While the first and second ethylenically unsaturated monomers (a) may be any ethylenically unsaturated monomer within the scope of such term (i.e., any monomer which bears ethylenic unsaturation, including doubly unsaturated monomers such as butadiene and which is capable of polymerizing in vinyl-type manner), it is preferred that the monomers be acrylic monomers (i.e., monomers based on acrylic, methacrylic or ethacrylic acids).

A preferred class of crosslinked dispersions useful in compositions of the invention is formed by free radical addition copolymerization, in the presence of the polymeric dispersion stabilizer and in the presence of a hydrocarbon dispersing liquid of: from about 1 to about 10, preferably from about 2 to about 5, mole percent of alpha, beta ethylenically unsaturated monocarboxylic acid; from about 80 to about 98, preferably from about 90 to about 96, mole percent of at least one other copolymerizable monoethylenically unsaturated monomer; and from about 1 to about 10, preferably from about 2 to about 5, mole percent of a crosslinking monomer selected from the group consisting of ethylenically unsaturated monoepoxides. The preferred alpha, beta ethylenically unsaturated monocarboxylic acids for use in this class of crosslinked dispersions are acrylic acid and methacrylic acid, with methacrylic acid being especially preferred.

Various other monoethylenically unsaturated monomers may be copolymerized with the acid monomer in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are: alkyl acrylates, such as methylacrylate, ethylacrylate, propylacrylate and butylacrylate and the alkyl methacrylates, such as methylmethacrylate, ethylmethacrylate, propylmethacrylate and butylmethacrylate. Other ethylenically unsaturated monomers which may be advantageously employed include, for example, the vinyl aromatic hydrocarbons, such as styrene, alpha-methylstyrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

Although numerous ethylenically unsaturated monoepoxides will come to the mind of those skilled in the art, representative of the most preferred monoepoxides for this class of crosslinked dispersions to which the improvement of this invention applies are glyicdyl acrylate and glycidyl methacrylate.

In a particularly preferred crosslinked dispersion embodiment within the aforementioned class, the monomers used in the addition copolymerization to form the dispersed polymer are characterized in that the alpha, beta ethylenically unsaturated monocarboxylic acid is methacrylic acid, the other copolymerizable monoethylenlly unsaturated monomer is methylmethacrylate and the crosslinking monomer is glycidyl methacrylate.

As discussed above, the polymeric dispersion stabilizer of the type of crosslinked dispersions used as flow control additives in compositions of this invention are generally those containing at least two segments, with one segment being solvated by the dispersing liquid and the other being of different polarity than the first segment and relatively insoluble in the dispersing liquid. Various types of such polymeric dispersion stabilizers are discussed in the aforementioned Makhlouf et al patent, the disclosure of which is hereby incorporated by reference. Preferred types of stable crosslinked dispersions to which the improvement of the invention applies are those in which the dispersion stabilizer is a graft copolymer containing two polymeric segments, of which one segment being solvated by the dispersing liquid and the second segment being an anchor polymer of different polarity than the first segment which is relatively non-solvatable by the dispersing liquid. Such preferred polymeric dispersion stabilizers contain pendent groups which react with the ethylenically unsaturated monomers in the copolymerization process used to make the crosslinked dispersion. Preferably such chemical reaction is by way of addition copolymerization with the ethylenically unsaturated monomers through ethylenic unsaturation on the polymeric dispersion stabilizer. A particularly preferred type of stable crosslinked dispersion which may be used as the flow control additive in compositions of the invention is that in which the polymeric dispersion stabilizer is of the aforementioned preferred graft copolymerized type which is formed by graft copolymerizing the reaction product of glycidyl methacrylate and poly (12-hydroxystearic acid) with methylmethacrylate and glycidyl methacrylate and reacting the resulting copolymer product containing pendent epoxy groups with methacrylic acid, thus adding ethylenic unsaturation to the stabilizer. It is this ethylenic unsaturation which allows the dispersion stabilizer to take part in the addition polymerization used in the preparation of the crosslinked dispersion.

This preferred type of dispersion stabilizer is preferably made by a four-step process which is accomplished in two sequential batches. The additive itself is prepared using the stabilizer in a manner which is similar to well known non-aqueous dispersion processing. First, hydroxystearic acid is self-condensed to form poly (12-hydroxystearic acid) a linear polyester having a terminal carboxyl group on one end and a terminal hydroxyl group on the other. This carboxyl terminated linear polyester (1 mole) is reacted with glycidyl methacrylate (1 mole). The glycidyl functionality reacts with the terminal carboxyl functionality to form an ester linkage, a hydroxyl group and terminal ethylenic unsaturation. This "macromonomer" (1 mole) is then reacted by free radical polymerization with methylmethacrylate (14.6 moles) and a small amount of glycidyl methacrylate (1.41 moles) to form the graft copolymer. This graft copolymer (1.41 epoxy equivalents) is then modified by reacting the epoxy group present from the polymerized glycidyl methacrylate with methacrylic acid (0.43 moles), thus providing a graft copolymer with vinyl groups or "hooks" extending from the methylmethacrylate backbone.

Preparation of this particularly preferred type of dispersion stabilizer used in preparing the type of crosslinked dispersions used as flow control additives in compositions of the invention will be more fully understood from the detailed examples.

Hydroxy Functional Film Forming Material

The film forming component of the compositions of the invention is a hydroxy functional material capable of crosslinking with a crosslinking agent having functionality thereon adapted to react with hydroxyl groups on the film former. As will be appreciated by those skilled in the art, there are numerous types of hydroxy functional film forming materials which may be crosslinked to form cured films on substrates. This film former may comprise one or more hydroxy functional polymers or copolymers as well as additional hydroxy functional monomeric materials if desired. Of course, additional film forming components, not bearing hydroxy functionality or bearing still other functionalities might also be included in the composition. These variations will be apparent to those skilled in the art.

Exemplary of the numerous hydroxy functional copolymers which may be employed as film formers in compositions to which the improvement of this invention applies are the various acrylic based copolymers, including particularly those which have number average molecular weights of at least 150 up to approximately 20,000 and glass transition temperatures ranging from between about $-25°$ C. and about 70° C. Typically, such copolymers may include between about 5 and about 50 weight percent of monoethylenically unsaturated monomers bearing hydroxy functionality and between about 95 and about 50 weight percent of other monoethylenically unsaturated monomers. The hydroxy functional monomers provide the copolymer with its hydroxy functionality and are selected typically from hydroxy alkyl esters of monoethylenically unsaturated carboxylic acids. The list of such typical hydroxy functional monomers suitable for forming such copolymers is well known to those skilled in the art and could include, for example, 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; dethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Preferred hydroxy functional monomers in such compositions are often $C_5$–$C_7$ hydroxy alkyl acrylates and/or $C_6$–$C_8$ hydroxy alkyl methacrylates, i.e., esters of $C_2$–$C_3$ dihydric alcohols and acrylic or methacrylic acids.

The remainder of monomers forming the such hydroxy functional copolymers typically are other monoethylenically unsaturated monomers which preferably are alpha, beta olefinically unsaturated monomers, i.e., monomers bearing olefinic unsaturation between the two carbons in the alpha and beta positions with respect to the terminus of an aliphatic carbon to carbon chain. As is well known, among the numerous alpha-beta olefinically unsaturated monomers which might be employed in such copolymers are acrylates, as defined herein, as well as mixtures of acrylates and vinyl hydrocarbons. Generally is such compositions in excess of 50 weight percent of the total are esters of $C_1$–$C_{12}$ monohydric alcohols and acrylic or methacrylic acids. Among monovinyl hydrocarbons suitable for use in forming copolymers of this type are those containing 8 to 12 carbon atoms and including styrene, alpha methylstyrene, vinyl toluene, t-butylstyrene and chlorostyrene. Generally when monovinyl hydrocarbons are employed, they constitute less than 50 weight percent of the copolymer. Also, other monomers such as vinyl chloride, acrylonitrile, methacrylonitrile, and vinyl acetate may be included in these compositions as modifying monomers; however, these modifying monomers should constitute only between about 0 and about 30 weight percent of the monomers in the copolymer.

As mentioned above, one or more hydroxy functional polymers or copolymers could be employed as the film forming material. For example, it may be desirable to employ hydroxy functional copolymers of varying molecular weights. Also, it may be desirable to include other hydroxy functional materials of the monomeric nature which would serve as reactive diluents in the compositions. These are only a few of the numerous types of combinations and modifications of film forming materials which could be employed.

Exemplary of the numerous types of compositions intended to be within the scope to which the improvement of this invention applies are compositions such as are disclosed and claimed in U.S. Ser. No. 945,027 filed Sept. 22, 1978 in the name of Chattha and the compositions which are disclosed and claimed in application Ser. No. 157,705, filed June 9, 1980, which is a continuation-in-part of U.S. Ser. No. 041,207 filed May 21, 1979 and Ser. No. 000,852 filed Jan. 4, 1979, as well as application Ser. No. 157,706 filed June 9, 1980, which is a continuation-in-part of U.S. Ser. No. 041,208 filed May 21, 1979 and Ser. No. 000,855 filed Jan. 4, 1979.

Crosslinking Agents

The other major conventional component of compositions to which the improvement of this invention is applicable is a crosslinking agent capable of reacting with the hydroxyl groups of the hydroxy functional film forming material to effect a cure of the composition. While it will be appreciated that the particular crosslinking agent is not critical to the invention and that many suitable materials may be selected, exemplary crosslinking agents are isocyanates and well known amino compounds.

Representative of isocyanate compounds useful as crosslinking agents in thermosetting coating compositions to which the improvement of the invention is applicable are polyisocyanates, i.e., compounds having two or more, preferably three or more, reactive isocyanate groups per molecule. These polyisocyanate crosslinking agents are included in compositions of the invention in amounts typically ranging from about 0.5 to about 1.6 isocyanate groups per hydroxyl group in the composition.

Polyisocyanates are well known in the art and numerous suitable isocyanates having two or more reactive isocyanate groups per molecule will be apparent to those skilled in the art. Among the many suitable polyisocyanates are aliphatic, cycloaliphatic and aromatic isocyanate compounds. Numerous representative polyisocyanate crosslinking agents are enumerated in the aforementioned application Ser. No. 157,705.

Amino crosslinking agents useful in compositions which the improvement of the invention may be applied are generally preferably condensation products of formaldehyde with melamine, substituted melamines, urea or substituted and unsubstituted benzoguanamine. Such multifunctional amino compounds, which are widely used in the coating industry, may be used in monomeric, polymeric or a mixture of monomeric and polymeric forms. Numerous examples of such representative amino compounds are also set forth in application Ser. No. 157,705.

Preferred Intermediate Solids Composition

As discussed above, the preferred intermediate solids compositions of the invention comprise three primary components: (i) a film forming component comprising a hydroxy functional copolymer; (ii) a butylated melamine formaldehyde crosslinking agent; and (iii) the flow control additive comprising a stable crosslinked dispersion as discussed above.

The film forming component of the intermediate solids composition comprises a hydroxy functional copolymer having a number average molecule weight ($M_n$) greater than about 5,000 and a glass transition temperature of between about $-25°$ C. and about $70°$ C. This hydroxy functional copolymer is formed from between about 5 and about 50, preferably between about 10 and about 30, weight percent of hydroxy functional monoethylenically unsaturated monomers and a remainder of other monoethylenically unsaturated monomers.

While numerous hydroxy functional monoethylenically unsaturated monomers may be employed in the preparation of copolymers useful as a film forming component in the compositions of the invention, preferred monomers of this type are selected from the group consisting of hydroxy bearing aliphatic alcohol and esters of alpha, beta monoethylenically unsaturated carboxylic acids. Most preferably, the hydroxy functional monomers which provide the copolymer with its hydroxy functionality are selected from hydroxy alkyl esters of monoethylenically unsaturated carboxylic acids. Typical of such alpha, beta monoethylenically unsaturated carboxylic acids are acrylic, methacrylic and ethacrylic acids. Among the numerous hydroxy functional monomers in this preferred class of monomers suitable for preparing the copolymers of the film forming component of the intermediate solids composition are those hydroxy functional monomers in the general description of the hydroxy functional film formers.

The remainder of other monoethylenically unsaturated monomers forming the hydroxy functional copolymer of the film forming component, i.e., between about 50 and about 95 weight percent, preferably between about 70 and about 90 weight percent, are preferably alpha-beta olefinically unsaturated monomers, i.e., monomers bearing olefinic unsaturation between the two carbon atoms in the alpha and beta positions with respect to the terminus of an aliphatic carbon to carbon chain.

In the preferred embodiment of the intermediate solids compositions, the remainder of other monoethylenically unsaturated monomers includes up to about 2 weight percent, based on the total weight of monomers used to prepare the hydroxy functional copolymer of an alpha, beta monoethylenically unsaturated carboxylic acid such as acrylic, methacrylic or ethacrylic acid.

The remainder of monoethylenically unsaturated monomers, other than the carboxylic acids discussed above, are preferably selected from acrylates (meaning esters of acrylic or methacrylic acids) as well as mixtures of acrylates and vinyl hydrocarbons. Preferably, in excess of 30 weight percent of the total copolymer monomers are esters of a $C_1$–$C_{12}$ monohydric alcohol and acrylic, methacrylic or ethacrylic acid, e.g., methylmethacrylate, ethylacrylate, butylacrylate, butylmethacrylate, hexylacrylate. 2-ethylhexylacrylate, laurylmethacrylate, etc. Among the monovinyl hydrocarbons suitable for use in forming such copolymers are those containing 8 to 12 carbon atoms and including styrene, alpha methylstyrene, vinyl toluene, t-butylstyrene and chlorostyrene. When such monovinyl hydrocarbons are employed, they should constitute less than about 50 weight percent of the copolymer. Other modifying vinyl monomers may also be included in this remainder of monoethylenically unsaturated monomers. These vinyl monomers such as vinyl chloride, acrylonitrile, methacrylonitrile, vinyl acetate, etc. should constitute only between about 0 and about 40 weight percent of the monomers of the hydroxy functional copolymer.

In preparing such copolymers suitable for use as the hydroxy functional film former of the intermediate solids compositions, the hydroxy functional monomers and the remaining monoethylenically unsaturated monomers are mixed and reacted, typically by conventional free radical initiated polymerization, in such proportions as to obtain the copolymers desired. A large number of free radical initiators are known to those skilled in the art and are suitable for this purpose. Polymerization is preferably carried out in solution using a solvent in which the hydroxy functional copolymer is soluble. Numerous solvents will be apparent to those skilled in the art.

In addition to the above discussed hydroxy functional copolymer, the hydroxy functional component of the intermediate solids compositions may also include other hydroxy functional materials in lesser amounts (i.e. up to a total of 50 parts, preferably less than 35 parts, of other hydroxy functional materials per 100 parts of the total hydroxy functional component). For example, the coating composition may further comprise one or more hydroxy functional copolymers having a number average molecular weight ($M_n$) of between about 1,500 and about 5,000 and a glass transition temperature between about $-25°$ C. and about $70°$ C. Such lower molecular weight hydroxy functional copolymers are generally formed from about 15 to about 35 weight percent, preferably from about 20 to about 30 weight percent, of hydroxy functional monoethylenicaly unsaturated monomers and a remainder of other monoethylenically unsaturated monomers. Suitable hydroxy functional and other monoethylenically unsaturated monomers are similar to those discussed above with respect to the higher molecular weight hydroxy functional copolymers.

The hydroxy functional film forming component of the intermediate solids coating compositions of the invention may also include, for example, one or more hydroxy functional oligoesters in an amount ranging from about 5 to about 50, preferably from about 10 to about 35, weight percent of the hydroxy functional film former. These suitable oligoesters are those described in U.S. patent application Ser. No. 157,705 filed June 9, 1980 and include those (i) having a number average molecular weight ($M_n$) of between about 150 and about 3,000, (ii) bearing at least two hydroxy groups per molecule, and (iii) being selected from the group consisting of: (a) esterification reaction products of polycarboxylic acids and monoepoxides; (b) esterification reaction products of polyepoxides and monocarboxylic acids, preferably monocarboxylic acids containing no ethylenic unsaturation and bearing no hydroxy functionality; (c) esterification reaction products of hydroxy functional carboxylic acids and mono- or polyepoxides, preferably monoepoxides; (d) esterification reaction products of monocarboxylic acids and hydroxy functional mono- or polyepoxides, preferably monoepoxides; and (e) mixtures of (a)-(d).

Still other hydroxy functional materials which will be apparent to those skilled in the art may be included in minor amounts.

Preferred High Solids Composition

As discussed above, the preferred high solids coating compositions of the invention comprise three primary components: (i) a film forming component consisting essentially of a polymeric component having a number average molecular weight of less than about 5,000; (ii) a crosslinking agent comprising monomeric methylated melamine resin; and (iii) the flow control additive comprising a stable crosslinked dispersion.

The film forming component of the high solids compositions consists essentially of a polymeric component having a number average molecular weight of less than about 5,000. The polymeric component comprises at least about 50 percent by weight of hydroxy functional copolymer having a number average molecule weight ($M_n$) of between about 1,500 and about 5,000 and a glass transition temperature of between about $-25°$ C. and about 70° C. This hydroxy functional copolymer is formed from between about 15 and about 35, preferably between about 20 and about 30, weight percent of hydroxy functional monoethylenically unsaturated monomers, between about 2 and about 5 weight percent of alpha, beta olefinically unsaturated carboxylic acids and a remainder of other monoethylenically unsaturated monomers.

While numerous hydroxy functional monoethylenically unsaturated monomers may be employed in the preparation of copolymers useful as a film forming component in the compositions of the invention, preferred monomers of this type are those described above in the description of the preferred intermediate solids compositions of the invention.

In the preferred hydroxy functional copolymers used in the high solids compositions of the invention, the alpha, beta olefinically unsaturated carboxylic acids in the monomer mix used to make the hydroxy functional copolymer are included in an amount ranging from about 2 to about 4 weight percent and are selected from acrylic, methacrylic and ethacrylic acids. It will be appreciated that other alpha, beta olefinically unsaturated carboxylic acids may also be employed.

The remainder of other monoethylenically unsaturated monomers forming the hydroxy functional copolymer of the film forming component, i.e., between about 60 and about 83 weight percent, preferably between about 65 and about 78 weight percent, are preferably alpha-beta olefinically unsaturated monomers, i.e., monomers bearing olefinic unsaturation between the two carbon atoms in the alpha and beta positions with respect to the terminus of an aliphatic carbon to carbon chain.

The remainder of monoethylenically unsaturated monomers are preferably selected from acrylates (meaning esters of acrylic or methacrylic acids) as well as mixtures of acrylates and vinyl hydrocarbons. Preferably, in excess of 30 weight percent of the total copolymer monomers are esters of a $C_1$-$C_{12}$ monohydric alcohol and acrylic, methacrylic or ethacrylic acid, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming such copolymers are those containing 8 to 12 carbon atoms and including styrene, alpha methylstyrene, vinyl toluene, t-butylstyrene and chlorostyrene. When such monovinyl hydrocarbons are employed, they should constitute less than about 50 weight percent of the copolymer. Other modifying vinyl monomers may also be included in this remainder of monoethylenically unsaturated monomers. These vinyl monomers such as vinyl chloride, acrylonitrile, methacrylonitrile, vinyl acetate, etc. should constitute only between about 0 and about 40 weight percent of the monomers of the hydroxy functional copolymer.

In preparing such copolymers suitable for use in the polymeric component of the film forming component of the high solids composition of the invention, the hydroxy functional monomers and the remaining monoethylenically unsaturated monomers are mixed and reacted, typically by conventional free radical initiated polymerization in the manner discussed above.

In addition to the above discussed hydroxy functional copolymer, other hydroxy functional polymeric materials may be employed in the polymeric component or film forming component of the compositions of the invention. Such other hydroxy functional polymeric materials will of course be included in lesser amounts (i.e. up to a total of about 50 parts, preferably less than about 30 parts, of such other hydroxy functional materials per 100 parts of the polymeric component of the film forming component of the compositions). For example, the polymeric component may further comprise one or more hydroxy functional oligoesters such as discussed above.

Still other hydroxy functional materials which will be apparent to those skilled in the art may be included in minor amounts in the polymeric component of the film forming component of the high solids compositions of the invention. Still further, minor amounts (i.e., up to about 25 parts, preferably less than about 10 parts, per 100 parts of the polymeric component) of other polymeric materials bearing no hydroxy functionality or other functionalities which do not interfere with the crosslinking reaction between the hydroxy functional materials and the crosslinking agent, may be employed.

The high solids coating compositions of the invention include between about 20 and about 100 parts, preferably between about 40 and about 80 parts per 100 parts of the film forming component of a crosslinking agent comprising monomeric methylated melamine resin having a number average molecular weight of between about 350 and about 1,000. Monomeric methylated melamine resins are prepared by the co-condensation of melamine, formaldehyde and methyl alcohol, usually in a two-step procedure. In order to maximize the amount of monomeric structure, the ratio of condensed formaldehyde to melamine is high, usually greater than 5 to 1 and more preferably greater than 5.5 to 1. The melamine formaldehyde condensation is usually done under alcoholic conditions. The etherification is then accomplished under acidic conditions with excess amounts of methanol to maximize the etherification and minimize condensation reactions that lead to dimers, trimers, etc. The ratios of methanol to melamine may range from 8 to 30 in this reaction step. Molecular weight ranges for this type of crosslinking material are between about 450 and 1,500 for weight average molecular weight and between about 350 and 1,000 as indicated above for number average molecular weight. The ratios of condensed methanol to melamine ranges from about 4.8 to about 6.

The high solids compositions of the invention also may include up to about 50, preferably up to about 30 weight percent, based on the total weight of crosslinking agent, of a butylated melamine formaldehyde crosslinking agent of the type described above in connection with the preferred intermediate solids compositions of the invention.

The invention will be more fully understood from the following detailed examples which are merely exemplary of the multitude of compositions which fall within the scope of the invention.

EXAMPLE 1 Preparation of Stabilizer

Hydroxystearic acid (2300 gms.) and xylene (255 gms.) are heater together in a reaction vessel fitted with a condenser and a water separator. The mixture is heated at reflux (begins at 170° C. and continues to rise with the removal of the by-product water to 198° C.) until the acid number reaches 37.5. The maximum reaction temperature is kept below 200° C. to prevent substantial amounts of dehydration, a secondary reaction to the desired esterification reaction. After 13 hours, the desired acid number is reached, removing 92 ml. of water layer. (Acid equivalent weight=1500).

The polyhydroxystearic acid prepared above (2455 gms.) is charged to a reactor fitted with a stirrer and reflux condensor. Glycidyl methacrylate (240 gms.), hydroquinone (2.1 gm.) and dimethyl dodecylamine (4.1 gms.) were added at 50° C. and heated to 130° C. After six hours, the acid number was reduced from 34.0 to 1.3. An oxygen sparge was introduced into the reactor throughout the entire reaction time. The reaction product was reduced with 1223 grams of butyl acetate. The macromonomer, thus produced, had a viscosity of A-A1 (Gardner-Holdt) at 61.5% NV.

The glycidyl methacrylate polyhydroxystearic acid product solution described above (1365 gms.) was combined with methyl methacrylate (744 gms.), glycidyl methacrylate (102 gms.) and azobis isobutyronitrile (AIBN) (35.4 gms.). This solution was added, dropwise to a refluxing (123° C.) solution of butyl acetate (591 gms.), xylene (135 gms) and AIBN (2.7 gms.) over a four and one-half hour period. The resultant copolymer solution was refluxed for an additional one hour, a solution of AIBN (4.0 gms.) in butyl acetate (84 gms.) was added, and the solution refluxed for an additional 2.0 hours. A solution of hydroquinone (2.7 gms.) in butyl acetate (60 gms.) was added and reflux continued for 0.5 hour. Methacrylic acid (12.1 gms.), dimethyl dodecylamine (0.75 gms.) and butyl acetate (20 gms.) were added. The reaction solution was refluxed for 3.5 hours at 125° C. The acid number was reduced to 1.0. The solution had a solids content of 55%.

EXAMPLE 2 Crosslinked Dispersion

A reactor, filled with a stirrer and a reflux condensor, was charged with methyl methacrylate (14 gms.), stabilizer from Example 1 (2.5 gms.), heptane (340 gms.) and AIBN (0.2 gms.). The solution was refluxed 0.5 hours (95° C.) and then a solution of

| methyl methacrylate | 348 grams |
| methacrylic acid | 12 grams |
| glycidyl methacrylate | 20 grams |
| stabilizer from Example 1 | 50 grams |
| dimethyl dodecylamine | 1.2 grams |
| octyl mercaptan | 2.3 grams |
| AIBN | 2.3 grams |
| VM & P Naptha | 150 grams | was added, at reflux, over a 4.5 hour period. A booster catalyst of 0.2 grams AIBN in 50 grams of butyl acetate was added and reflux continued for 2.5 hours. The dispersion had a 28 second viscosity (#4 Ford Cup) at 44% NV.

EXAMPLE 3 Further Stabilization of Crosslinked Dispersion

The dispersion prepared in Example 2 was mixed with a butylated melamine formaldehyde resin in the following proportions:

| Dispersion | 556 parts |
| Melamine Resin A* | 385 parts |
| Isopropyl Acetate | 59 parts |

*Melamine Resin A is a commercially available butylated melamine formaldehyde resin having a number average molecular weight in the range of about 700 to about 2500 and which is 65% nonvolatiles in a 2/1 blend of butyl acetate/butyl alcohol (Syn U Tex 4113E, sold by Celanese Coatings and Specialties Company). The viscosity of the 65% solution is a W (Gardner-Holdt).

The mixture with a milky white dispersion with a viscosity of 42 seconds in a #2 Ford Cup. The mixture remained a stable dispersion for one month. The mixture filtered easily through 10 micron mesh bags.

EXAMPLES 4–11

Further stabilization in accordance with the invention of the dispersion of Example 2 and comparison with such a dispersion not stabilized in accordance with the invention is illustrated in the following table.

| | | Example | | | | | | | |
|---|---|---|---|---|---|---|---|---|---|
| | % NV | 4 | 5 | 6 | 7 | 8 | 9 | 10 | 11 |
| Dispersion of Example 2 | 44 | 556 | 556 | 556 | 556 | 556 | 556 | 631 | 454 |
| Cymel 325 | 80 | 313 | | | | | | | |
| Cymel 1158 | 80 | | 313 | | | 313 | 313 | | |
| Syn-U-Tex 4113E | 65 | | | 385 | | | | 285 | 462 |
| Acrylic Resin A | 80 | | | | 313 | | | | |
| Methyl Ethyl Ketone | | | | | | 131 | | | |
| Methyl Amyl Ketone | | 131 | 131 | 59 | 131 | | | | |
| Isopropyl Acetate | | | | | | | 131 | 84 | 84 |
| Stability | | Poor | Exc. | Exc. | Poor | Exc. | Exc. | Exc. | Exc. |

Cymel 325 is a methylated melamine formaldehyde resin available from American Cyanamid
Cymel 1158 is a butylated melamine formaldehyde resin available from American Cyanamid
Acrylid Resin A is a 68/30/2 butyl methacrylate hydroxyethyl acrylate/acrylic acid copolymer of Mn = 2400 in methyl amyl ketone.

EXAMPLE 12

A white enamel was prepared from the following ingredients:

| | |
|---|---|
| Acrylic Resin G | 2862 parts |
| Melamine Resin A (See Example 3) | 1174 parts |
| Crosslinked Dispersion of Example 3 | 744 parts |
| White Millbase* | 3423 parts |
| Cellosolve Acetate | 348 parts |
| Isopropylalcohol | 1044 parts |

Acrylic Resin G is an acrylic copolymer of 30/30/20/18/2 styrene/butyl methacrylate/ethylhexylacrylate/hydroxypropyl methacrylate/acrylic acid composition. The resin has a T viscosity at 50% solids in 1/1 methylamyl ketone/VM&P Naphtha.

*The white millbase is prepared by mixing

| | |
|---|---|
| Titanium dioxide | 600 parts |
| Acrylic Resin D | 250 parts |
| VM&P Naphtha | 110 parts |
| Methyl Amyl Ketone | 50 parts |
| Butyl Acetate | 40 parts |
| Toluene | 40 parts |
| Xylene | 8 parts |

Acrylic Resin D is an acrylic copolymer of 28/30/20/20/2 styrene/butyl methacrylate/ethylhexylacrylate/hydroxypropyl methacrylate/acrylic acid. The resin has a T viscosity at 60% solids in 1/1 methyl amyl ketone/VM&P Naptha.

EXAMPLE 13

Silver Metallic Enamel

A silver metallic enamel was prepared by mixing the following ingredients.

| | |
|---|---|
| Acrylic Resin A$^{(a)}$ | 2166 |
| Acrylic Resin B$^{(b)}$ | 1634 |
| Melamine Resin X$^{(c)}$ | 1086 |
| Flow Control Additive (Example 3) | 1100 |
| Aluminum paste (60% aluminum flake) | 175 |
| Polybutyl acrylate (60% in xylene) | 31 |
| Isobutyl acetate | 963 |
| Ethylene glycol ethyl ether acetate | 745 |

The enamel was sprayed on a primed steel panel and cured for 17 minutes at 265° F. in a forced air oven. The panel had excellent brilliance and distinctness of image due to the even distribution of aluminum flake in the paint. A control enamel with no flow control additive appeared much darker and showed an uneven distribution of aluminum flake or mottling.

(a) Acrylic Resin A is a typical automotive thermoset acrylic resin with a monomeric composition of 37/20/27/15/1 styrene/methyl methacrylate/butyl acrylate/hydroxypropyl methacrylate/acrylic acid. The resin has a Z viscosity at 55% NV in 70/12/18 cellosolve acetate/butanol/toluene.

(b) Acrylic Resin B is an automotive thermoset acrylic resin with a 30/30/20/19/1 styrene/butyl methacrylate/2-ethylhexyl/acrylate/hydroxypropyl methacrylate/acrylic acid composition. The resin had a T viscosity at 50% nonvolatiles in 50/50 cellosolve acetate/isopropyl acetate.

(c) Melamine Resin X is a butylated melamine resin with a U viscosity at 65% nonvolatiles in 3/1 butyl acetate/butyl alcohol and a ASTM D1198 mineral spirits tolerance of 300.

EXAMPLE 14

A white enamel was prepared by mixing the following ingredients.

| | |
|---|---|
| Titanium Dioxide Millbase$^{(d)}$ | 2891 |
| Acrylic Resin C$^{(e)}$ | 1241 |
| Acrylic Resin D$^{(f)}$ | 1099 |
| Melamine Resin X (same as in Ex. 10) | 1173 |
| Polybutyl acrylate (60% in xylene) | 25 |
| Isobutyl acetate | 2268 |
| Ethylene glycol monoethyl ether acetate | 558 |
| Flow Control Additive (Example 3) | 229 |

A primed panel was sprayed so that a film thickness wedge of 1.7 mils to 3.5 mils was realized after the panel was baked for 17 minutes at 265° F. Sagging of the film began at the 2.5 mil thickness region. A control enamel which did not contain the flow control additive sagged at about 1.9 mils.

(d) The Millbase was prepared from:

| | |
|---|---|
| Titanium dioxide | 600 parts |
| Acrylic Resin D | 250 parts |
| VM&P Naptha | 110 parts |
| Methyl Amyl Ketone | 50 parts |
| Butyl Acetate | 40 parts |
| Toluene | 40 parts |
| Xylene | 8 parts |

(e) Acrylic Resin C is an acrylic copolymer of 30/30/20/18/2 styrene/butyl methacrylate/2-ethylhexyl acrylate/hydroxypropyl methacrylate/acrylic acid. The resin had a Z viscosity at 50% solids in xylene.

(f) Acrylic Resin D is an acrylic copolymer of 28/30/20/20/2 styrene/butyl methacrylate/ethylhexyl acrylate/hydroxypropyl methacrylate/acrylic acid. The resin had a T viscosity at 60% solids in 1/1 methyl amyl ketone/VM&P Naptha.

EXAMPLE 15

A white enamel was prepared by mixing the following ingredients.

| | Parts |
|---|---|
| Acrylic Resin G$^{(a)}$ | 3362 |
| Cymel 325$^{(b)}$ | 1381 |
| Flow Control Additive (Example 3) | 597 |
| Phenyl acid phosphate | 32 |
| White Millbase | 3077 |
| Butanol | 382 |
| Methanol | 242 |
| 2-Ethylhexyl Acetate | 245 |
| Monobutyl ether of diethylene glycol | 140 |
| Methyl amyl ketone | 411 |

The white millbase was prepared from:

| | |
|---|---|
| Titanium dioxide | 2215 |
| Acrylic Resin H$^{(c)}$ | 385 |
| Methyl amyl ketone | 446 |
| Isopropyl acetate | 25 |

The enamel has a weight solids content of 66% and a #4 Ford Cup viscosity of 31.5 seconds. When sprayed on a primed panel and cured at 265° F. for 20 minutes, no sagging was observed at film thicknesses below 70 microns film thickness.

(a) Acrylic Resin G is an acrylic copolymer of 71/25/4 butyl methacrylate/hydroxyethyl acrylate/acrylic acid which has a Z1 viscosity a 80% NV in methyl amyl ketone.

(b) Cymel 325 is a methylated formaldehyde-melamine resin at 80% NV and is a commercial product of American Cyanamid Company.

(c) Acrylic Resin H is an acrylic copolymer of 68/30/2 butyl methacrylate/hydroxyethyl acrylate/acrylic acid which has a Z viscosity at 80% NV in methyl amyl ketone.

EXAMPLE 16

A dark green enamel with improved aluminum control and good sag resistance was prepared by mixing the following ingredients.

|  | Parts |
| --- | --- |
| Acrylic Resin G | 3586 |
| Cymel 325 | 1370 |
| Flow Control Additive | 965 |
| Phenyl Acid Phosphate | 24 |
| Aluminum Paste[1] | 128 |
| Yellow Millbase[2] | 603 |
| Blue Millbase[3] | 185 |
| Black Millbase[4] | 254 |
| Methanol | 225 |
| Ethyl Acetate | 177 |
| Butyl Acetate | 177 |
| Methyl Amyl Ketone | 201 |
| Cellosolve Acetate | 112 |
| Butyl Alcohol | 238 |
| Ethylhexyl Acetate | 81 |

The enamel was 60% weight solids at 29 seconds viscosity in a #4 Ford Cup.

(1) The aluminum paste was a mixture of:

|  |  |
| --- | --- |
| Acrylic Resin H | 31.25 |
| Aluminum Flake | 25. |
| VMP Naptha | 12.2 |
| Butyl Alcohol | 6.5 |
| Cellosolve Acetate | 25. |

(2) The yellow millbase was a mixture of:

|  |  |
| --- | --- |
| Yellow shade phthalocyanine green | 90 |
| Acrylic Resin H | 181 |
| Methyl Amyl Ketone | 120 |
| Butyl Alcohol | 211 |

(3) The blue millbase was a mixture of:

|  |  |
| --- | --- |
| Phthalocyanine blue | 15 |
| Melamine Resin X | 37 |
| Butyl Alcohol | 133 |

(4) The black millbase was a mixture of:

|  |  |
| --- | --- |
| Furnace black | 13 |
| Acrylic Resin H | 196 |
| Methanol | 21 |
| Xylene | 24 |

In view of the disclosure, many modifications of this invention will be apparent to those skilled in the art. It is intended that all such modifications which fall within the true scope of this invention be included within the terms of the appended claims.

I claim:

1. A coating composition comprising:
   (I) a film forming component comprising hydroxy functional copolymer having a number average molecular weight ($M_n$) of from greater than about 150 up to about 20,000 and a glass transition temperature ($T_g$) ranging from between about −25° C. and about 70° C., said copolymer being formed from about 5 to about 50 weight percent of hydroxy functional monoethylenically unsaturated monomers;
   (II) crosslinking agent selected from amino compounds and isocyanate compounds; and
   (III) a flow control additive in an amount ranging from about 0.5 to about 30 parts of resin solids in said flow control additive per 100 parts of total resin solids in said composition, said flow control additive comprising a stable, crosslinked dispersion containing microgel particles, said dispersion
   (i) being formed by addition polymerization of (a) between about 1 and about 10 mole percent each of first and second ethylencially unsaturated monomers, each bearing functionality capable of crosslinking reaction with the other, and (b) between about 80 and about 98 mole pecent of at least one other monoethylenically unsaturated monomer in the presence of (I) a hydrocarbon dispersing liquid which is solvent for the polymerization monomers, but a non-solvent for the resultant polymer, and (II) polymeric dispersion stabilizer containing at least two segments, with one segment being solvated by said dispersing liquid and the other segment being of different polarity than said first segment and relatively insoluble in said dispersing liquid, wherein the reaction is carried out at elevated temperature such that the dispersion polymer first forms and then is crosslinked and
   (ii) being stabilized further by inclusion therein of a further stabilizer which, except for solvent, consists essentially of butylated melamine formaldehyde resin having a number average molecular weight in the range of about 700 to about 2,500, said further stabilizer being included in said crosslinked dispersion in an amount ranging from about 25 to about 75 parts of resin solids per 100 parts of total resin solids in said crosslinked dispersion.

2. A coating composition in accordance with claim 1 wherein
   said hydroxy functional copolymer has a number average molecular weight ($M_n$) of greater than about 5,000, and
   said crosslinking agent comprises between about 20 and about 100 parts per 100 parts of said film forming component of butylated melamine formaldehyde having a number average molecular weight ($M_n$) of between about 700 about 2500.

3. A coating composition in accordance with claim 1 wherein
   said film forming component consists essentially of a polymeric component having a number average molecular weight of less than about 5,000, said polymeric component comprising at least about 50 percent by weight of hydroxy functional copolymer having a number average molecular weight ($M_n$) of between about 1,500 and about 5,000 and a glass transition temperature of between about −25° C. and about 70° C., said hydroxy functional copolymer being formed from about 15 to about 35 weight pecent of hydroxy functional monoethylenically unsaturated monomers, between about 2 and about 5 weight percent of alpha, beta olefinically unsaturated carboxylic acids and a remainder of other monoethylenically unsaturated monomers, and said crosslinking agent comprises between about 20 and about 100 parts per 100 parts of said film forming component of monomeric methylated melamine resin having a number average molecular weight of between about 350 and about 1,000.

4. A coating composition in accordance with claim 1, 2 or 3 wherein said polymeric dispersion stabilizer employed in preparation of said flow control additive is a graft copolymer containing two polymeric segments, with one segment being solvated by said dispersing liquid and the second segment being an anchor polymer of different polarity than said first segment and relatively non-solvatable by said dispersing liquid, and wherein said polymeric dispersion stabilizer contains pendent groups which have been addition copolymerized with the ethylenically unsaturated monomers in the copolymerization process.

5. A coating composition in accordance with claim 4 wherein said polymeric dispersion stabilizer is formed by graft copolymerizing the reaction product of glycidyl methacrylate and poly (12-hydroxystearic acid) with methylmethacrylate and glycidyl methacrylate and then reacting the resulting copolymer product containing pendent epoxy groups with methacrylic acid.

6. A coating composition in accordance with claim 1, 2 or 3 wherein the functionalities of said first and second ethylenically unsaturated monomers used to form said dispersed polymer of said flow control additive respectively are selected from the group consisting of: (a) acid and epoxide; (b) epoxide and amine; (c) acid anhydride and hydroxyl; (d) acid anhydride and amine; (e) acid anhydride and mercaptan; (f) isocyanate and hydroxyl; (g) hemiformal and amide; (h) carbonate and amine; (i) cycloimide and amine; (j) cycloimide and hydroxyl; and (k) imine and alkoxysilane.

7. A coating composition in accordance with claim 6 wherein said dispersing liquid is an aliphatic hydrocarbon solvent and said first and second ethylenically unsaturated monomers (a) and said at least one other ethylenically unsaturated monomer (b) used in preparation of said flow control additive are acrylic monomers.

8. A coating composition in accordance with claim 6 wherein said flow control additive dispersion is formed by free radical addition copolymerization in the presence of hydrocarbon dispersing liquid of from about 2 to about 5 mole percent of alpha, beta ethylenically unsaturated monocarboxylic acid, from about 90 to about 96 mole percent of at least one other copolymerizable monoethylenically unsaturated monomer and from about 2 to about 5 mole percent of crosslinking monomer selected from the group consisting of ethylenically unsaturated monoepoxides.

9. A coating composition in accordance with claim 8 wherein said monomers used in said addition copolymerization to form said dispersed polymer of said flow control additive are characterized in that said alpha, beta ethylenically unsaturated monocarboxylic acid is methacrylic acid, said other copolymerizable monoethylenically unsaturated monomer is methylmethacrylate and said crosslinking monomer is glycidyl methacrylate.

10. A stable crosslinked dispersion in accordance with claim 1, 2 or 3 wherein said further stabilizer is included in said crosslinked dispersion of said flow control additive in an amount ranging from about 40 to about 60 parts of resin solids per 100 parts of total resin solids in said crosslinked dispersion.

11. A coating composition in accordance with claim 10 wherein said crosslinked dispersion including said further stabilizer contains between about 40 and about 60 percent solids.

12. A coating composition in accordance with claim 1, 2 or 3 wherein said stable crosslinked dispersion of said flow control additive is:

(i) formed by addition polymerization of between about 1 and about 10 mole percent of alpha, beta ethylenically unsaturated monocarboxylic acid, from about 80 to about 98 percent of at least one other copolymerizable monoethylenically unsaturated monomer and from about 1 to about 10 mole percent of crosslinking monomers selected from the group consisting of ethylenically unsaturated monoepoxides, in the presence of (I) a hydrocarbon dispersing liquid which is a solvent for the polymerizable monomers, but a non-solvent for the resultant polymer, and (II) polymeric dispersion stabilizer containing at least two segments, with one segment being solvated by said dispersing liquid and the second segment being of different polarity than said first segment and relatively insoluble in said dispersing liquid, said polymeric dispersion stabilizer being formed by graft copolymerizing the reaction product of glycidyl methacrylate and poly (12-hydroxystearic acid) with methylmethacrylate and glycidyl methacrylate and reacting the resulting copolymer product containing pendent epoxy groups with methacrylic acid, wherein the reaction is carried out at elevated temperatures such that the dispersion polymer first forms and then is crosslinked; and (ii) stabilized further by inclusion therein of a further stabilizer which, except for solvent, consists essentially of butylated melamine formaldehyde resin having a number average molecular weight in the range of about 700 to about 2,500, said further stabilizer being included in said crosslinked dispersion in an amount ranging from about 25 to about 75 parts of resin solids per 100 parts of total resin solids in said crosslinked dispersion.

13. A coating composition in accordance with claim 12 wherein said monomers used in the addition copolymerization to form said dispersed polymer of said flow control additive are characterized in that said alpha, beta ethylenically unsaturated monocarboxylic acid is methacrylic acid, said other copolymerizable monoethylenically unsaturated monomer is methylmethacrylate and said crosslinking monomer is glycidyl methacrylate.

14. A coating composition in accordance with claim 13 wherein said further stabilizer is included in said crosslinked dispersion of said flow control additive in an amount ranging from about 40 to about 60 parts resin solids per 100 parts of total resin solids in said crosslinked dispersion.

15. A coating composition in accordance with claim 13 wherein said crosslinked dispersion including said further stabilizer contains between about 40 and about 60 percent solids.

16. A coating composition in accordance with claim 13 wherein said further stabilizer of said flow control additive consists essentially of a solution of butylated melamine formaldehyde resin in organic solvent in an amount such that the percentage solids of said butylated melamine formaldehyde resin in said solvent ranges from about 50 to about 90 percent.

17. A coating composition in accordance with claim 16 wherein said further stabilizer of said flow control additive consists essentially of a 65 percent solids solution of said butylated melamine formaldehyde resin in a 2/1 solution of butyl acetate and butyl alcohol.

18. A coating composition in accordance with claim 2 wherein (a) said hydroxy functional copolymer is formed from about 10 to about 30 weight percent of hydroxyl bearing aliphatic alcohol esters of acrylic and methacrylic acids and a remainder of other monoethylenically unsaturated monomers, including up to 2 weight percent based on the total weight percent of monomers used to form said copolymer of acrylic or methacrylic acid, said remainder, other than said acrylic or methacrylic acids, being selected from the group consisting of acrylates, methacrylates, monovinyl hydrocarbons having between 8 and 12 carbon atoms and other modifying vinyl monomers; and (b) said butylated melamine crosslinking agent comprises the reaction product of butyl alcohol, melamine and formaldehyde.

19. A coating composition in accordance with claim 2 wherein said film forming of component comprises between about 50 and about 90 weight percent of said hydroxy functional copolymer having a number average molecular weight ($M_n$) of greater than about 5,000 and between about 10 and about 50 weight percent of at least one hydroxy functional copolymer having a number average molecular weight ($M_n$) of between about 1,500 and about 5,000 and a glass transition temperature of between about $-25°$ C. and about $70°$ C. said hydroxy functional copolymers being formed from about 15 to about 35 weight percent of hydroxy functional monoethylenically unsaturated monomers, and a remainder of other monoethylenically unsaturated monomers.

20. A coating composition in accordance with claim 3 wherein (a) said hydroxy functional copolymer is formed from about 20 to about 30 weight percent of hydroxyl bearing aliphatic alcohol esters of acrylic and methacrylic acids, between about 2 and about 4 weight percent of acrylic or methacrylic acid and a remainder of other monoethylenically unsaturated monomers selected from the group consisting of acrylates, methacrylates, monovinyl hydrocarbons having between 8 and 12 carbon atoms, and other modifying vinyl monomers; and (b) said crosslinking agent comprises monomeric methylated melamine resin havng a number average molecular weight of between about 350 and about 1,000 and up to 30 weight percent based on the weight of said crosslinking agent of butylated melamine formaldehyde crosslinking agent having a number average molecular weight of between about 700 and about 2,500.

21. A coating compositions in accordance with claim 18 or 20 wherein said stable crosslinked dispersion of said flow control additive is:

(i) formed by addition polymerization of between about 1 and about 10 mole percent of alpha, beta ethylenically unsaturated monocarboxylic acid, from about 80 to about 98 mole percent of at least one other copolymerizable monoethylenically unsaturated monomer and from about 1 to about 10 mole percent of crosslinking monomers selected from the group consisting of ethylenically unsaturated monoepoxides, in the presence of (I) a hydrocarbon dispersing liquid which is a solvent for the polymerizable monomers, but a non-solvent for the resultant polymer, and (II) polymeric dispersion stabilizer containing at least two segments, with one segment being solvated by said dispersing liquid and the other segment being of different polarity than said first segment and relatively insoluble in said dispersing liquid, said polymeric dispersion stabilizer being formed by graft copolymerizing the reaction product of glycidyl methacrylate and poly (12-hydroxystearic acid) with methylmethacrylate and glycidyl methacrylate and reacting the resulting copolymer product containing pendent epoxy groups with methacrylic acid, wherein the reaction is carried out at elevated temperatures such that the dispersion polymer first forms and then is crosslinked; and (ii) stabilized further by inclusion therein of a further stabilizer which, except for solvent, consists essentially of butylated melamine formaldehyde resin having a number average molecular weight in the range of about 700 to about 2,500, said further stabilizer being included in said crosslinked dispersion in an amount ranging from about 25 to about 75 parts of resin solids per 100 parts of total resin solids in said crosslinked dispersion.

22. A coating composition in accordance with claim 21 wherein said further stabilizer is included in said crosslinked dispersion of said flow control additive in an amount ranging from about 40 to about 60 parts resin solids per 100 parts of total resin solids in said crosslinked dispersion.

23. A coating composition in accordance with claim 21 wherein said crosslinked dispersion including said further stabilizer contains between about 40 and about 60 percent solids.

24. A coating composition in accordance with claim 21 wherein said further stabilizer of said flow control additive consists essentially of a 65 percent solids solution of said butylated melamine formaldehyde resin in a 2/1 solution of butyl acetate and butyl alcohol.

25. A coating composition in accordance with claim 21 wherein said further stabilizer of said flow control additive consists essentially of a solution of butylated melamine formaldehyde resin in organic solvent in an amount such that the percentage solids of said butylated melamine formaldehyde resin in said solvent ranges from about 50 to about 90 percent.

* * * * *